United States Patent
Hall

(10) Patent No.: US 9,435,102 B2
(45) Date of Patent: *Sep. 6, 2016

(54) VIBRATORY RIPPER HAVING PRESSURE SENSOR FOR SELECTIVELY CONTROLLING ACTIVATION OF VIBRATION MECHANISM

(71) Applicant: Ronald Hall, Woodstock (CA)

(72) Inventor: Ronald Hall, Woodstock (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/566,275

(22) Filed: Dec. 10, 2014

(65) Prior Publication Data

US 2015/0090466 A1     Apr. 2, 2015

Related U.S. Application Data

(63) Continuation of application No. 13/275,972, filed on Oct. 18, 2011, now Pat. No. 8,950,506, which is a continuation-in-part of application No. 12/906,850, filed on Oct. 18, 2010, now Pat. No. 8,074,726.

(51) Int. Cl.
*A01B 35/00* (2006.01)
*E02F 5/32* (2006.01)
*A01B 13/08* (2006.01)

(52) U.S. Cl.
CPC .............. *E02F 5/326* (2013.01); *A01B 13/08* (2013.01)

(58) Field of Classification Search
CPC .. A01B 11/00; A01B 59/002; A01B 59/065; E01C 23/124; E02F 5/102; E02F 5/103; E02F 5/326

USPC ....... 172/1, 40, 56, 272, 554, 699, 165, 667, 172/735; 404/117, 133.02, 133.05; 405/174, 180–183, 271, 303

See application file for complete search history.

(56) References Cited

U.S. PATENT DOCUMENTS

| | | |
|---|---|---|
| 3,618,237 A | 11/1971 | Davis |
| 4,087,982 A | 5/1978 | Golobay |
| 4,379,595 A | 4/1983 | Roussin et al. |
| 4,909,333 A | 3/1990 | Lindstrom |
| 5,482,121 A | 1/1996 | Draney et al. |
| 6,244,355 B1 | 6/2001 | Hall |
| 7,546,883 B1 | 6/2009 | Doering et al. |

*Primary Examiner* — Robert Pezzuto
(74) *Attorney, Agent, or Firm* — Katten Muchin Rosenman LLP

(57) ABSTRACT

A ripping mechanism for a vehicle has a support frame, and a ripping member having an engagement head for plowing a groove. The ripping member is positionable in a selected working position and orientation by adjustment of the frame. The ripping member is movable relative to the frame to cause reciprocating movement of the engagement head at least partially longitudinally. A tilt adjustment cylinder orients the ripping member in the selected orientation. A vibrator mechanism operatively connected to the ripping member is activatable to cause reciprocating movement of the engagement head at least partially longitudinally. A control system includes a pressure sensor fluidically connected to the tilt adjustment cylinder and the pressure sensor determines a pressure thereof. The control system is configured to alter an operational state of the vibrator mechanism based on the pressure being above or below a threshold pressure.

13 Claims, 8 Drawing Sheets

VIBRATORY RIPPER HAVING PRESSURE SENSOR FOR SELECTIVELY CONTROLLING ACTIVATION OF VIBRATION MECHANISM

CROSS-REFERENCE TO RELATED APPLICATIONS

This application is a continuation of U.S. patent application Ser. No. 13/275,972, filed Oct. 18, 2011, entitled "Vibratory Ripper Having Pressure Sensor For Selectively Controlling Activation Of Vibration Mechanism", which is a continuation-in-part of U.S. patent application Ser. No. 12/906,850, filed Oct. 18, 2010, entitled "Vibratory Ripper", the contents of which are incorporated herein by reference.

FIELD OF THE INVENTION

The present invention relates to plowing, trenching and ripping machines and more particularly to rippers that are used for ripping hard materials, such as rock, concrete and the like.

BACKGROUND OF THE INVENTION

Plowing, trenching and ripping machines are well known for digging trenches or various depths and through various types of material. In certain situations, such as when trying to form a trench through rock, concrete or the like, such machines can encounter some difficulty. It has been proposed in the past to use vibration to assist with such machinery. However, while the use of a vibrator mechanism may assist with this operation, it can cause additional stress on the machine itself. It is desirable to find ways of reducing the stresses incurred by the machines as a result of the use of vibrator mechanisms.

SUMMARY OF THE INVENTION

Generally speaking, the invention is directed to a ripping mechanism for a vehicle. The ripping mechanism includes a support frame, a ripping member and an impact mechanism which is configured to reciprocate the ripping member forwardly and rearwardly. The impact mechanism is preferably a vibrator mechanism.

According to one aspect of the invention, the ripping mechanism has a longitudinal axis, is mountable to the vehicle and is movable between a raised position and a lowered position. The ripping member has an engagement head that is configured for plowing a groove in the ground and that is pivotally supported on the support frame about a ripping member pivot axis that is positioned such that pivoting of the ripping member displaces the engagement head longitudinally. The impact mechanism is preferably a vibrator mechanism. The vibrator mechanism is connected to the ripping member wherein activation of the vibrator mechanism causes reciprocating pivoting movement of the ripping member.

According to another aspect of the invention a ripping mechanism for a vehicle is provided which includes a support frame, a ripping member, a tilt adjustment cylinder, a vibrator mechanism, a pressure sensor, and a control system. The support frame has a longitudinal axis and including a main frame portion that is mountable to a vehicle and a ripping member frame portion that is pivotably connected relative to the main frame portion. The ripping member is pivotally mounted to the ripping member frame portion about a laterally oriented ripping member pivot axis. The ripping member has an engagement head that is configured for plowing a groove in the ground. The tilt adjustment cylinder is connected between the main frame portion and the ripping member frame portion and is adjustable in length for orienting the ripping member frame portion in a selected orientation to control the angle of attack of the engagement head. The vibrator mechanism is operatively connected to the ripping member. Activation of the vibrator mechanism causes reciprocating movement of the engagement head at least partially longitudinally when the ripping member frame portion is in the selected orientation. The control system includes a pressure sensor fluidically connected to the tilt adjustment cylinder for determining hydraulic pressure supporting the ripping member frame portion. The control system is configured to deactivate the vibrator mechanism based at least in part on the pressure sensed by the pressure sensor.

According to another aspect of the invention a ripping mechanism for a vehicle is provided which includes a support frame, a ripping member, a tilt adjustment cylinder, a vibrator mechanism, a pressure sensor, and a control system. The ripping member has an engagement head that is configured for plowing a groove in the ground. The ripping member is positionable in a selected working position and working orientation by adjustment of the support frame. The ripping member is movable relative to the support frame to cause reciprocating movement of the engagement head at least partially longitudinally. The tilt adjustment cylinder is operable to orient the ripping member in the selected orientation. The vibrator mechanism is operatively connected to the ripping member and is activatable to cause reciprocating movement of the engagement head at least partially longitudinally. The control system includes a pressure sensor fluidically connected to the tilt adjustment cylinder for determining hydraulic pressure supporting the ripping member frame portion. The control system is configured to deactivate the vibrator mechanism based at least in part on the pressure sensed by the pressure sensor.

According to another aspect of the invention a ripping mechanism for a vehicle is provided which includes a support frame, a ripping member, a vibrator mechanism, and a control system. The control system is configured to determine when the ripping member is engaged with hard material using the pressure sensor. When the ripping member is engaged with hard material, the control system is configured to permit operation of the vibrator mechanism. In some embodiments, the control system may further be configured to automatically start the vibrator mechanism when it detects that the ripping member is engaged with hard material. When the ripping member is not engaged with hard material, the control system is configured to deactivate the vibrator mechanism. In some embodiments, deactivation of the vibrator mechanism means that the control system turns off the vibrator mechanism. In some other embodiments, deactivation of the vibrator mechanism means that the control system prevents operation of the vibrator mechanism. In yet other embodiments deactivation of the vibrator mechanism may entail both turning off the vibrator mechanism and preventing operation of the vibrator mechanism. In yet other embodiments, the control system may include a switch that permits a vehicle operator to select which of these aforementioned actions the control system takes when determining that the ripping member is not engaged with hard material.

BRIEF DESCRIPTION OF THE DRAWINGS

The present invention will now be described by way of example only with reference to the attached drawings, in which:

FIG. 3b is top view of the ripping mechanism shown in FIG. 3a;

FIG. 4 is a simplified schematic diagram showing a portion of a hydraulic system and a control system utilized by the ripping mechanism shown in FIG. 3a;

DETAILED DESCRIPTION OF THE INVENTION

Figure 1:
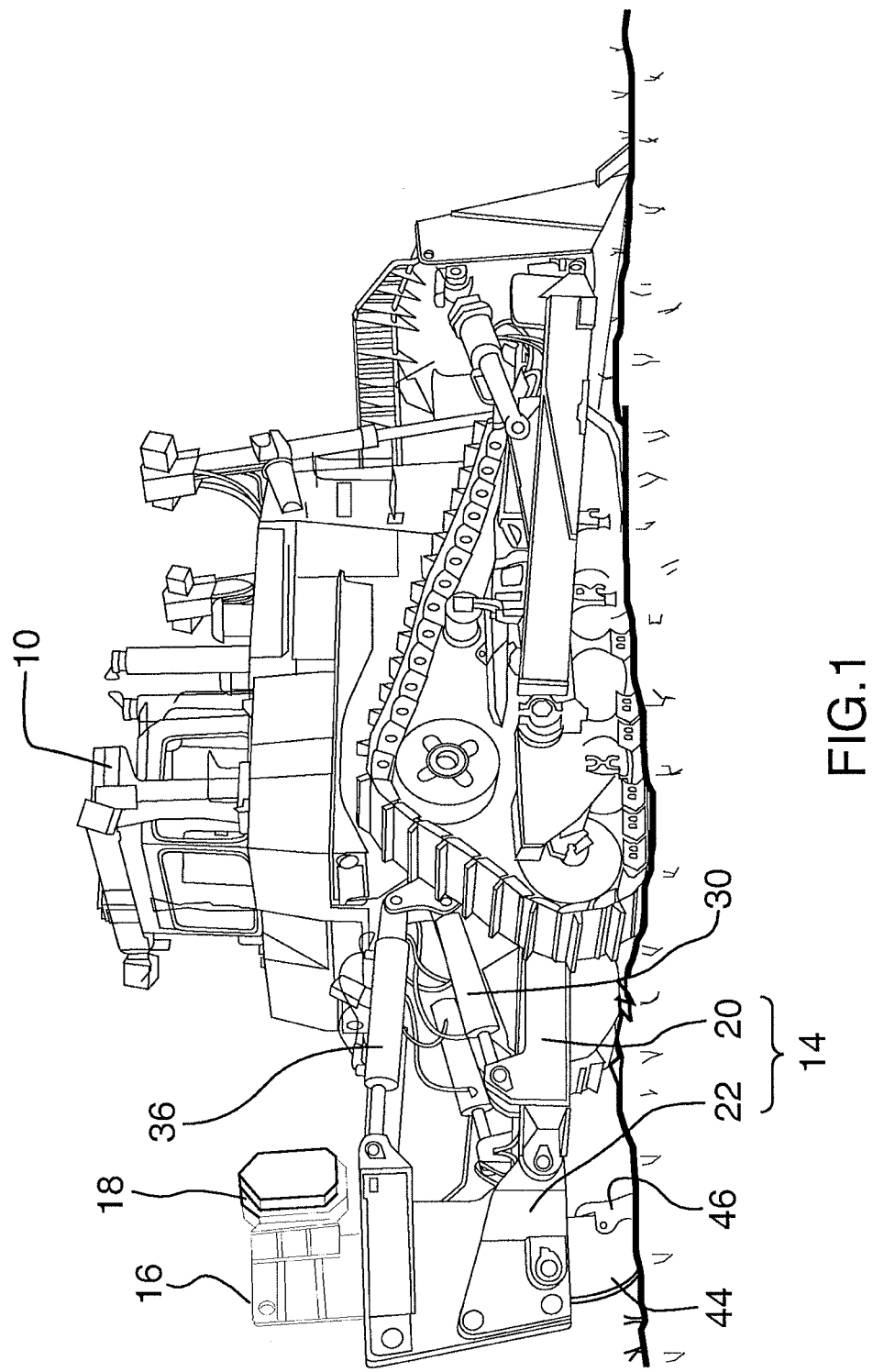
FIG. 1 is a perspective view of a vehicle with a ripping mechanism in accordance with an embodiment of the invention.

Reference is made to FIG. 1, which shows for a vehicle 10 with a ripping mechanism 12 in accordance with an embodiment of the present invention. The vehicle 10 may be any type of vehicle, such as, for example, a bulldozer, an excavator, a tractor, a trencher, a pipelayer, a brush tractor or a utility plow.

The ripping mechanism 12 includes a support frame 14, a ripping member 16 and a vibrator mechanism 18. In the exemplary embodiment shown in FIGS. 2a and 2b, the support frame 14 has a longitudinal axis shown at 19.

The support frame 14 is mountable to the vehicle 10 and is movable between a raised position (FIG. 2b) and a lowered position. FIG. 1 shows the support frame 14 in a partially lowered position.

Figure 2A:
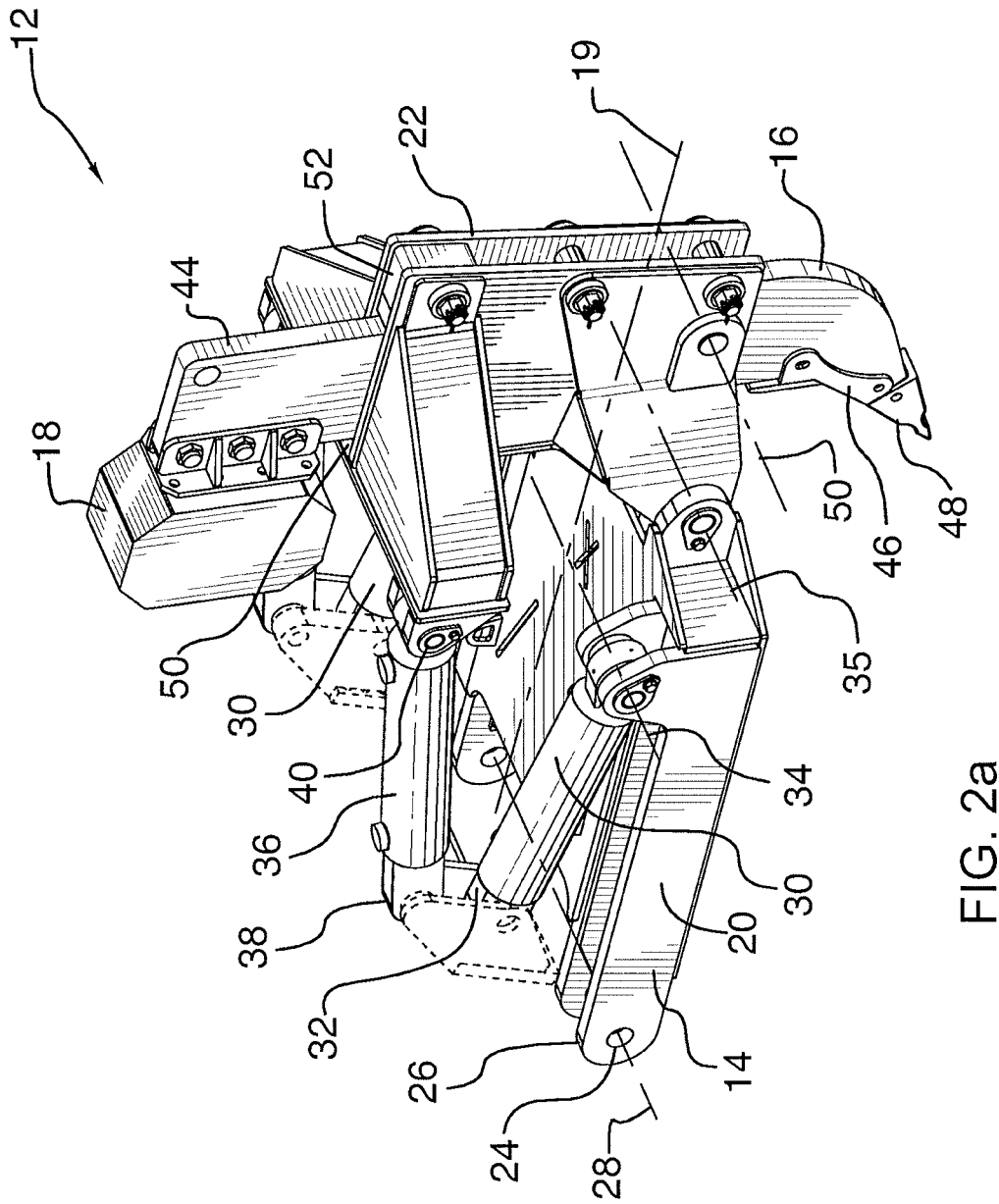
FIG. 2a is a perspective view of the ripping mechanism shown in FIG. 1.
Figure 2B:
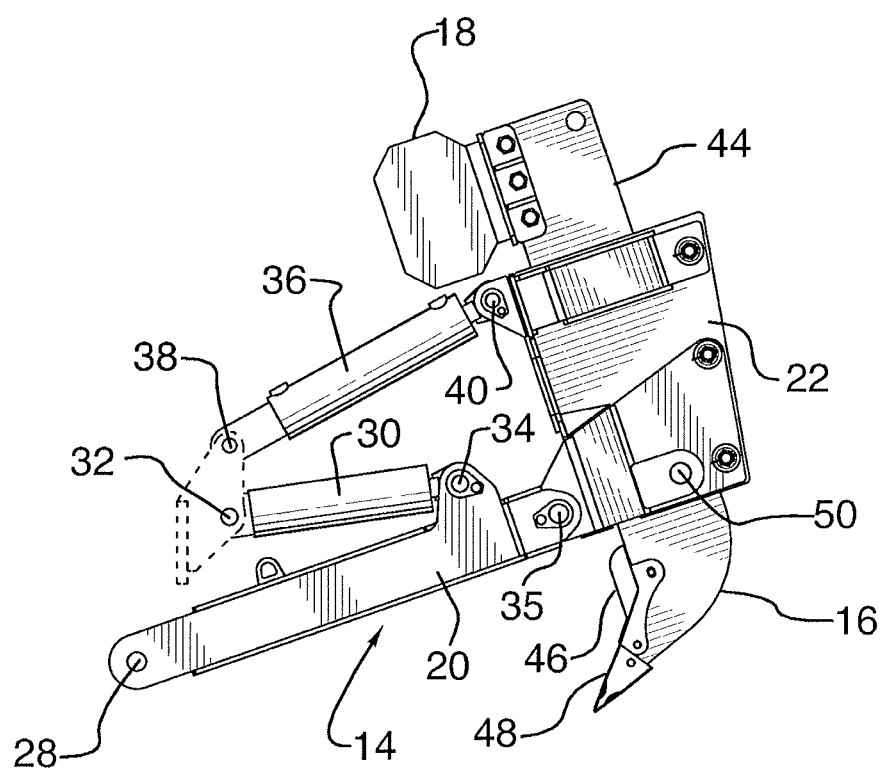
FIG. 2b is a side view the ripping mechanism shown in FIG. 1.

The support frame 14 includes a main frame portion 20 and a ripping member frame portion 22 that is movably supported on the main frame portion 20. The main frame portion 20 has a pivot connector 24 at its front end (shown at 26) for pivotally connecting to the vehicle 10 about a main frame portion pivot axis 28. At least one height adjustment cylinder 30 is provided and is pivotally connectable to the vehicle at a first end 32 and is pivotally connectable at a second end 34 to the main frame portion 20. In this exemplary embodiment, there are two adjustment cylinders 30 (as shown in FIG. 2a). The adjustment cylinders 30 are preferably hydraulic cylinders and may be connected to a source of pressurized hydraulic fluid from the vehicle 10. The height adjustment cylinders 30 are positioned such that changing the amount of extension of the height adjustment cylinders 30 pivots the main frame portion 20 about the main frame portion pivot axis 28 thereby changing the angle of the main frame portion 20 relative to the vehicle 10. Because of the position of the ripping member frame portion 22 relative to the main frame portion pivot axis 28, (ie. because the ripping member frame portion 22 is horizontally offset from the pivot axis 28), extending or retracting the cylinders 30 causes a change in height of the ripping member frame portion 22 relative to the vehicle 10.

Figure 2C:
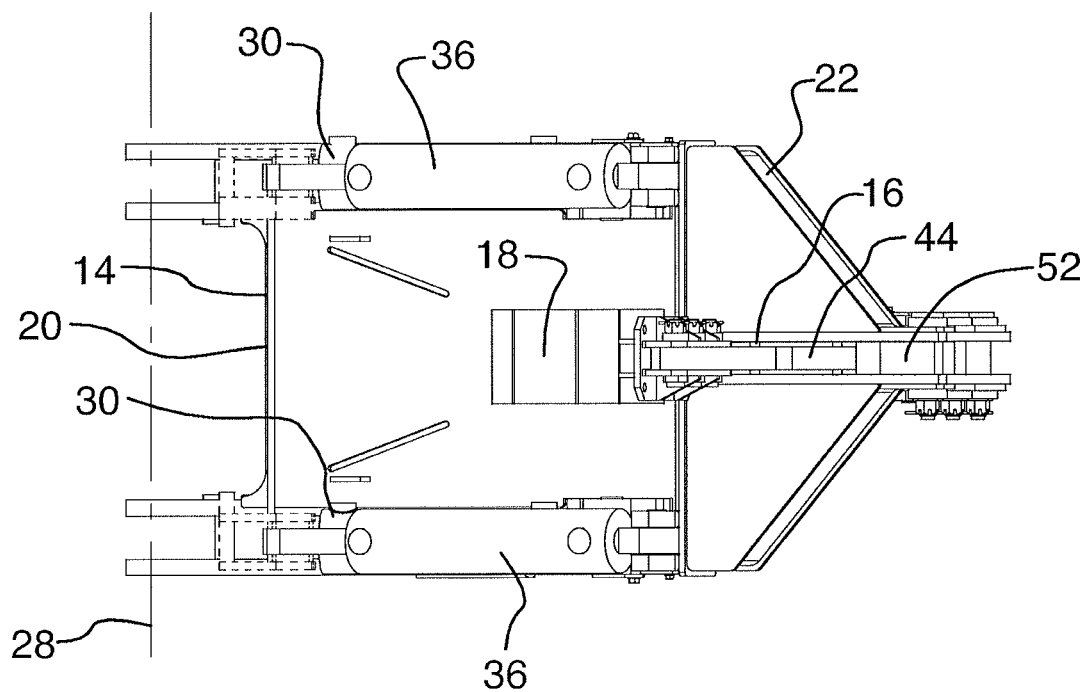
FIG. 2c is a top view of the ripping mechanism shown in FIG. 1.

In the exemplary embodiment shown, the ripping member frame portion 22 is pivotally connected to the main frame portion 20 about a ripping member frame pivot axis 35. At least one tilt adjustment cylinder 36 is provided and is pivotally connectable at a first end 38 to the vehicle 10 and is pivotally connectable at a second end 40 to the ripping member frame portion 22. In this exemplary embodiment, there are two adjustment cylinders 36 (as shown in FIG. 2c). The adjustment cylinders 36 are preferably hydraulic cylinders and may be connected to a source of pressurized hydraulic fluid from the vehicle 10. The tilt adjustment cylinders 36 are positioned such that changing the amount of extension of the tilt adjustment cylinders 36 pivots the ripping member frame portion 22 about the ripping member frame pivot axis 35.

In the embodiment shown, extending and retracting the height adjustment cylinders 30 causes the ripping member frame portion 22 to pivot relative to the main frame portion 20 unless the tilt adjustment cylinders 36 are simultaneously extended or retracted along with the cylinders 30. It is alternatively possible however, for the tilt adjustment cylinders 36 to connect at their first ends 38 to the main frame portion 20 and not to the vehicle 10, in which case, extending and retracting the height adjustment cylinders 30 would not cause the ripping member frame portion 22 to pivot relative to the main frame portion 20.

The ripping member 16 has a ripping member body 44, a trench wall forming member 46 and an engagement head 48, both of which are removably mountable to the ripping member body 44 via threaded fasteners so that they can be removed and replaced when worn. The engagement head 48 is configured for plowing a groove in the ground and has a selected shape, particularly at its leading edge, to facilitate breaking up rock, concrete and other hard materials via repeated impact. The engagement head is preferably replaceable to facilitate repair in the event of wear. The ripping member body 44 (and therefore, the ripping member 16) is pivotally supported on the ripping member frame portion 22 about a ripping member pivot axis 50, which extends laterally so that pivoting of the ripping member 24 changes the angle of attack of the engagement head 48.

At least one aft limit member 52 and at least one forward limit member 54 are provided on the ripping member frame portion 22, and are positioned to limit the forward and afterward movement of the ripping member 16 about the ripping member pivot axis 50. The aft and forward limit members 52 and 54 are preferably made from a resilient material such as neoprene.

The vibrator mechanism 18 is connected to the ripping member 16 and in the embodiment shown is mounted solely and directly to the ripping member body 44. Activation of the vibrator mechanism 18 causes reciprocating pivoting movement of the ripping member 16 about the ripping member pivot axis 50 between the forward and aft limit members 54 and 52. It can be seen from the figures that the pivot axis 50 is vertically closer to the bottom of the ripping member 16, where the engagement head 48 is located, than the top of the ripping member 16, where the vibrator mechanism 18 is located. This provides leverage to amplify the torque provided by the vibrator 18 about the pivot axis 50, which advantageously increases the force applied in the longitudinal direction by the engagement head 48.

Figure 5:
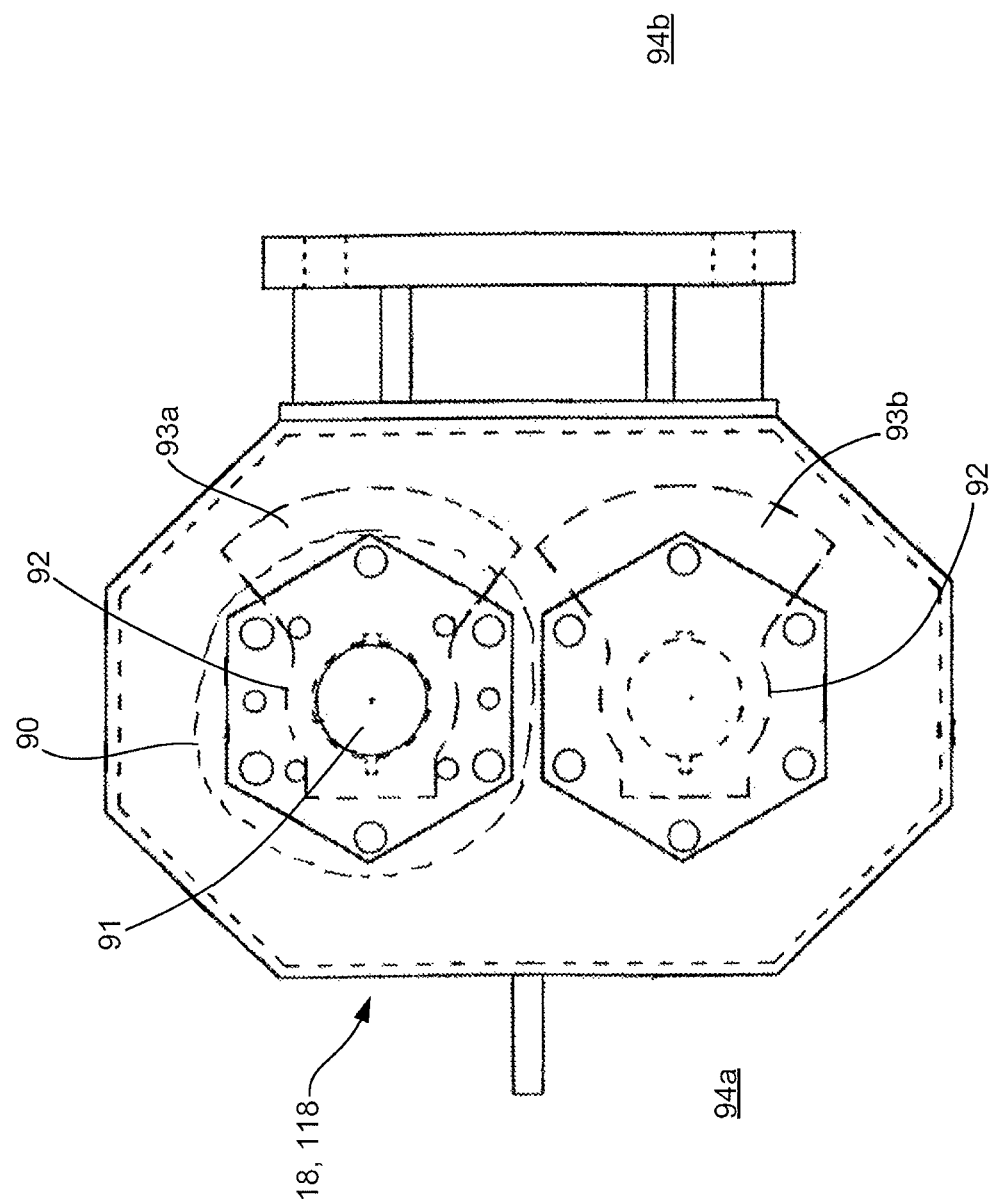
FIG. 5 is a magnified elevation view of a vibrator mechanism that is part of the ripping mechanism shown in FIG. 1.

The vibrator mechanism 18 may have any suitable structure. In a preferred embodiment shown in FIG. 5, the vibrator mechanism 18 includes a motor 90 that has an output shaft 91 oriented along a laterally directed axis, which drives one or more eccentrically weighted rotating members 92. In the embodiment shown in FIG. 5, two rotating members 92 are driven by the motor 90. The two rotating members 92 are geared together and arranged so that they counter-rotate, and so that their eccentrically weighted portions shown at 93*a* and 93*b*, are on the front side (shown at 94*a*) at the same time and on the rear side (shown at 94*b*) at the same time so that their effect is additive. However, when the first weighted portion 93*a* is at the top of its rotation, the second weighted portion 93*b* is at the bottom of its rotation and vice versa, so that their effects are canceled by one another. As a result of this arrangement, the eccentrically mounted weights 92 generate essentially no vertical vibration force and essentially no laterally directed vibration force, but significant longitudinally directed force, so as to generate longitudinal vibration on the ripping member 16. The motor 90 may be a hydraulic motor and may thus be connected to a hydraulic power source from the vehicle 10. Alternatively the motor 90 could be an electric motor, or any other suitable kind of motor.

It will be noted that, while the angle of attack of the engagement head 52 is adjustable, the movement of the engagement head 52 is substantially longitudinal due to its position being substantially directly vertically offset from the ripping member pivot axis 50 when the ripper mechanism 12 is in a lowered position suitable for ripping. While this is advantageous, it is not necessary, and it is possible for the engagement head 52 to move in a direction that is largely longitudinal but that has a significant vertical component.

Figure 3A:
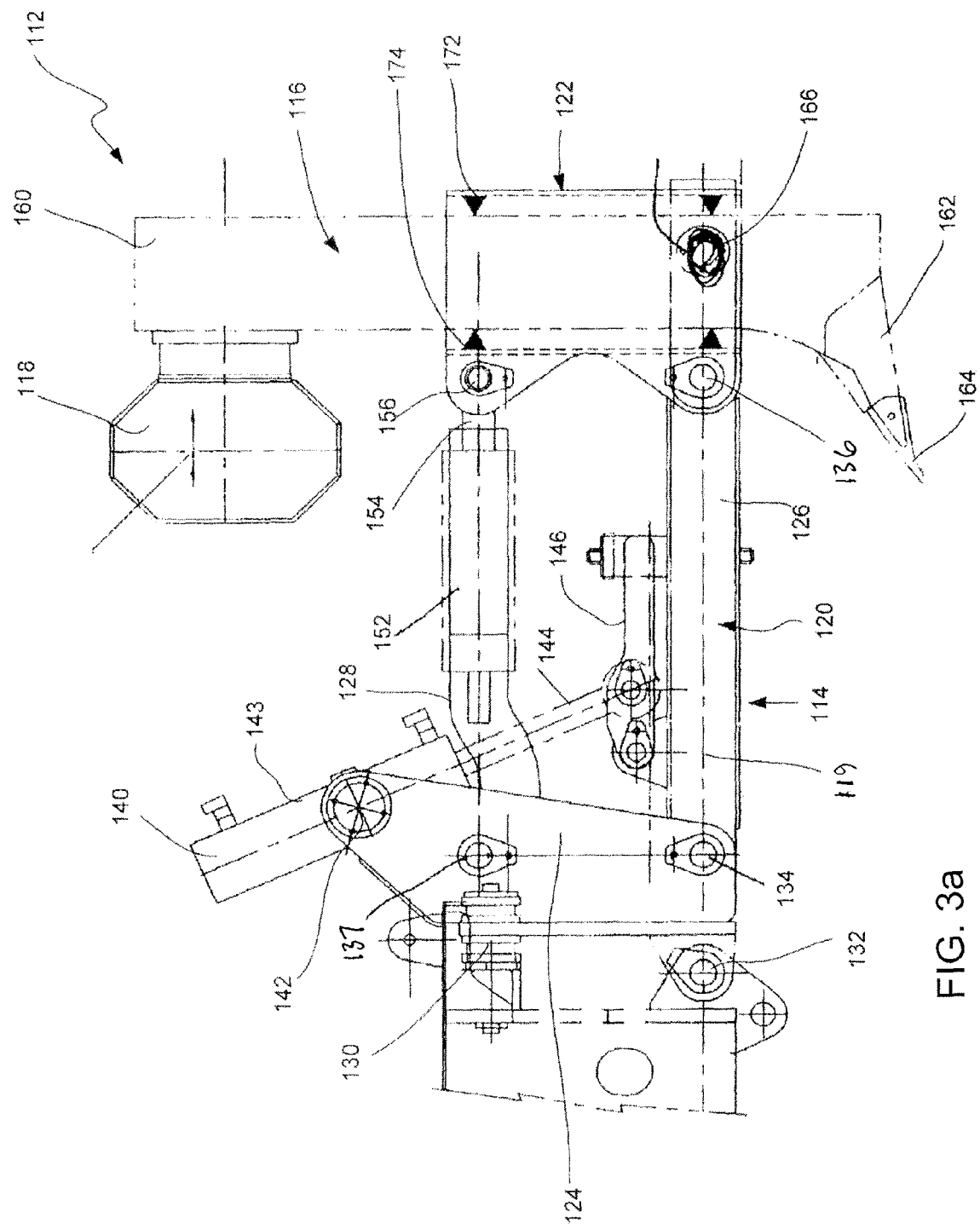
FIG. 3a is a side view of a ripping mechanism according to a second embodiment of the present invention.
Figure 3B:
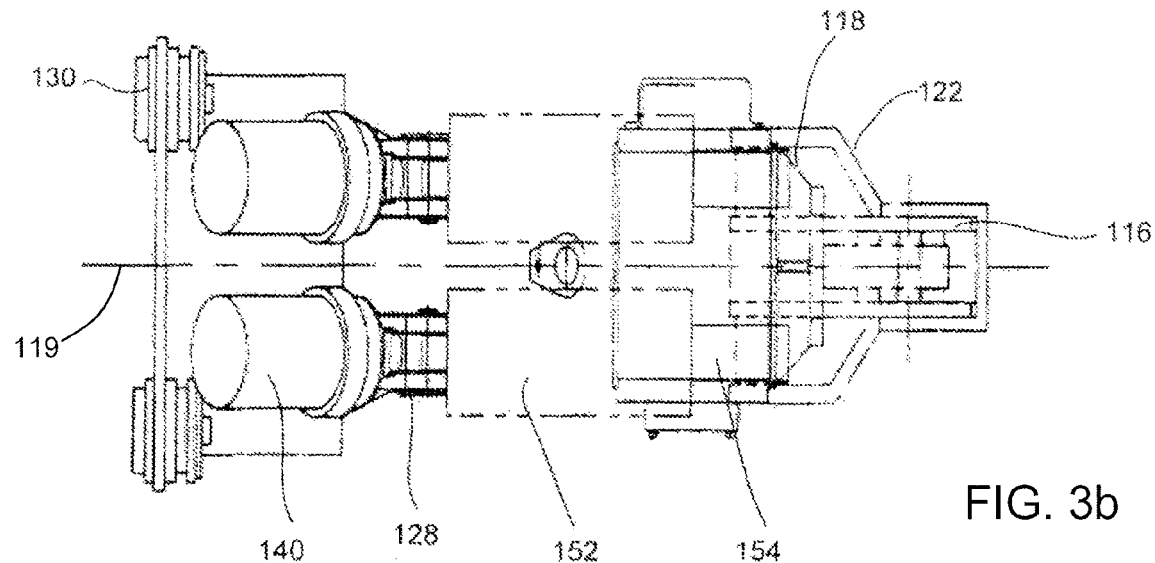

FIGS. 3*a* and 3*b* show another embodiment of a ripping mechanism 112, which includes a support frame 114, a ripping member 116 and a vibrator mechanism 118. In the exemplary embodiment shown in FIGS. 2*a* and 2*b*, the support frame 14 has a longitudinal axis shown at 19.

The support frame 114 is mountable to the vehicle (not shown) and is movable between a raised position and a lowered position shown in FIG. 3*a*. The support frame 114 has a longitudinal axis 119. The support frame 114 includes a main frame portion 120 and a ripping member frame portion 122 that is movably supported on the main frame portion 120.

The main frame portion 120 includes a mounting plate 124, a longitudinally oriented lower carriage portion 126, and longitudinally oriented upper arm portions 128.

The mounting plate 124 includes mounting features 130, 132 for mounting the support frame 114 to the vehicle as a modular unit, including all adjustment cylinders as will be discussed in greater detail below. These mounting features will vary depending on the vehicle to which the support frame 114 is mounted.

The longitudinally oriented lower carriage portion 126 is pivotally connected at one end thereof via pivot joint 134 to the mounting plate 124. The longitudinally oriented lower carriage portion 126 is pivotally connected at the opposite end thereof via pivot joint 136 to the ripping member frame portion 122. The lower carriage portion 126 can be formed as a box, or more preferably utilizing two substantially parallel longitudinally extending rails.

At least one and preferably two height adjustment cylinders 140 as seen best in FIG. 3*b* are connected between the mounting plate 124 and the longitudinally oriented lower carriage portion 126. In the illustrated embodiment the height adjustment cylinder housings shown at 143 are pivotally connected to ears 142 on the mounting plate 124 and the pistons or extensible portions shown at 144 of the height adjustment cylinders 140 are pivotally connected to an isolation mount 146 pivotally mounted to the lower carriage portion 126.

Each longitudinally oriented upper arm portion 128 is pivotally connected at one end thereof via pivot joint 137 to the mounting plate 124. The opposite end of each upper arm portion 128 is connected to a tilt adjustment cylinder 152, with the piston or extensible portion 154 thereof being pivotally connected to the ripping member frame portion 122 via pivot joint 156.

The ripping member 116 has a ripping member body 160, a trench wall forming member 162 and an engagement head 164, both of which are removably mountable to the ripping member body 160 via threaded fasteners so that they can be removed and replaced when worn. The engagement head 164 has a selected shape particularly at its leading edge to facilitate breaking up rock, concrete and other hard materials via repeated impact. The ripping member body 160 (and therefore, the ripping member 116) is pivotally supported on the ripping member frame portion 122 about a laterally extending ripping member reciprocating axis 166 analogous to the ripping member pivot axis 50 described in connection with other embodiments.

At least one aft limit member 172 and at least one forward limit member 174 are provided on the ripping member frame portion 122, and are positioned to limit the forward and afterward movement of the ripping member 116 about the ripping member reciprocating axis 166. The aft and forward limit members 172 and 174 are preferably made from a resilient material such as neoprene.

The vibrator mechanism 118 is connected to the ripping member 116 and in the embodiment shown is mounted solely and directly to the ripping member body 160. Activation of the vibrator mechanism 118 causes reciprocating pivoting movement of the ripping member 116 about the ripping member reciprocating axis 166 between the forward and aft limit members 174 and 172.

The vibrator mechanism 118 may be similar to the vibrator mechanism 18.

It will thus be seen from the foregoing that the support frame 114 is designed as two parallel four-bar linkages. Extension and retraction of the height adjustment cylinders 140 will cause the lower carriage portion 126 to pivot about a lateral axis disposed at pivot joint 134, which in turn cause the upper arm portions 128 to pivot about a lateral axis defined by pivot joint 150. As the ripping member frame portion 122 is connected to the lower carriage portion 126 and upper arm portions 128, actuation of the height adjustment cylinders 140 will raise and lower a working position of the ripping member frame portion 122 relative to the ground. In addition, extension and retraction of the tilt adjustment cylinders 152 will cause the ripping member frame portion 122 to pivot about a lateral axis defined by the lower pivot joint 136. As the ripping member frame portion 122 pivots, it will cause a change a change in working orientation and in the angle of the ripping member body 160 relative to the ground, consequently changing the angle of attack of the engagement head 168.

It will be noted that, while the angle of attack of the engagement head 164 is adjustable, for at least some angles of attack its position is substantially directly vertically offset from the ripping member reciprocating axis 166 when the ripper mechanism 112 is in a lowered position suitable for ripping. As a result, the movement of the engagement head 164 is substantially longitudinal in such situations. Furthermore, because the vibratory forces generated by the vibrator mechanism 118 is largely longitudinally directed, relatively little vertical vibratory force and vibratory motion may be imparted to the ripping member 116 and to the engagement head 164 more particularly. While this is advantageous, it is not necessary, and it is possible for the engagement head 164 to move in a direction that is largely longitudinal but that has a significant vertical component.

Figure 4:
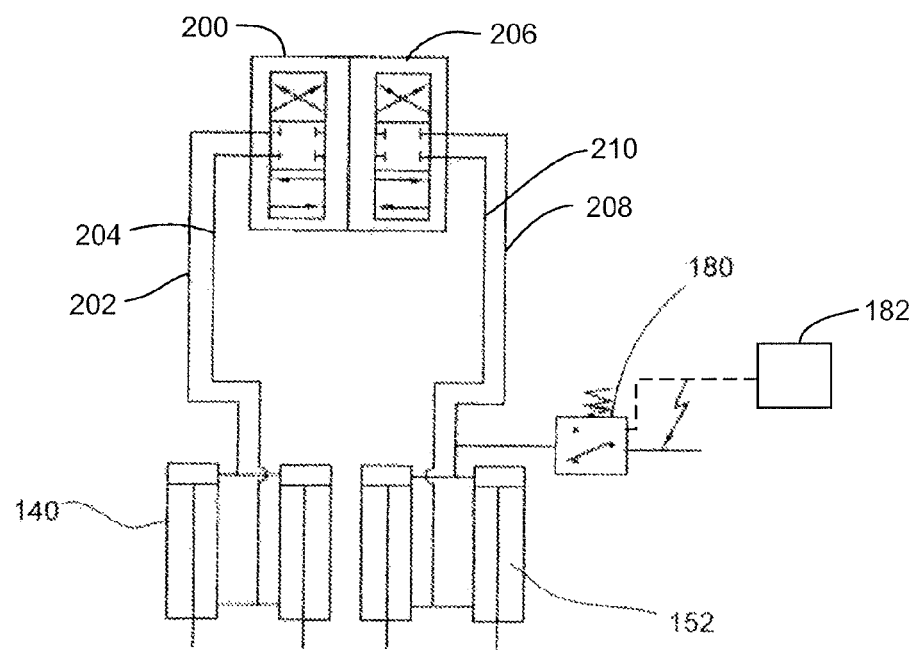

The hydraulic flow diagram for the lift and tilt adjustment cylinders 140 and 152 is shown in FIG. 4. As can be seen the height adjustment cylinders 140 both connect to a height adjustment cylinder control valve 200 via a first height adjustment cylinder hydraulic line 202 and a second height adjustment cylinder hydraulic line 204. When the control valve 200 is in the position shown in FIG. 4, the height adjustment cylinders 140 are maintained in a particular selected position. When the control valve 140 is moved one way or the other from the position shown in FIG. 4, the height adjustment cylinders 140 either extend or retract to raise or lower the ripping member 116. As can also be seen, the tilt adjustment cylinders 152 both connect to a tilt adjustment cylinder control valve 206 via a first a first tilt adjustment cylinder hydraulic line 208 and a second tilt adjustment cylinder hydraulic line 210. When the control valve 206 is in the position shown in FIG. 4, the tilt adjustment cylinders 152 are maintained in a particular selected position. When the control valve 206 is moved one way or the other from the position shown in FIG. 4, the tilt adjustment cylinders 152 either extend or retract to change the orientation of the ripping member 116 in one rotational direction or the other.

During operation of the ripping mechanism, the vibrator mechanism 18 or 118 transmits a great deal of vibrational energy to the ripping member 16 or 116. When the ripping member 16 is in the ground with the engagement head 48 or 164 engaged with relatively hard material, the vibrational energy is at least partially absorbed by the ground, which reduces any deleterious effect it has on the components of the ripping mechanism 12 or 112 and of the vehicle 10 itself. However, if the engagement head is lifted out of its trench the vibrational energy generated by the vibrator mechanism 18 or 118 can induce a great deal of stress on the ripping mechanism 12 or 112 and the vehicle 10, which could cause increased wear and potentially premature failure of one or more components thereof. The same problem can occur if the engagement head 48 or 164 remains in the trench but encounters soft soil, or becomes spaced from the front end of the trench, which can occur, for example, if the vehicle 10 backs up or if the adjustment cylinders 30, 36, 130 or 136 are adjusted to adjust the height or orientation of the ripping member 16 or 116.

In order to prevent inadvertent stressing of the ripping mechanism 12 or 112 and the vehicle 10, a pressure sensor 180 shown in FIG. 4 is connected to the first tilt adjustment cylinder hydraulic line 208 and thus reads the pressure in the line 208 that is used to support the ripping member 116 in any particular selected orientation. When the vibrator mechanism 118 is on, the pressure in the hydraulic line 208 varies over a range of pressures as the engagement head reciprocates back and forth. This range of pressures depends on several factors such as how aggressively the vehicle 10 is being driven forward to urge the engagement head 48, 164 into engagement with the front end of the trench, and the hardness of the material at the front end of the trench. When the engagement head is engaged with hard material, the hard material exerts a relatively strong resistance to the impacts from the engagement head 48, 164 and thus exerts a strong reactionary force on the engagement head 48, 164. This in turn urges the ripping member frame portion 22 to urge the tilt adjustment cylinder pistons shown at 214 to retract (in the embodiment shown in FIG. 3a). This increases the pressure in line 208, and decreases the pressure in line 210, as compared to a scenario where the engagement head 48, 164 was not engaged with any material, or was engaged with relatively soft material (e.g. loose earth) that offered little resistance to its impacts. Thus the peak pressure read by the pressure sensor 180 during engagement with hard material would be higher than the peak pressure read by the pressure sensor 180 during engagement with soft material or no material.

As a result of this difference in peak pressures in the two situations (i.e. engaged with hard material or engaged with soft material/no material), a controller shown at 182, which receives signals from the pressure sensor 180, can determine whether the engagement head 48, 164 is engaged with hard material or not. In the embodiment shown, where the pressure sensor 180 senses the pressure on line 208, a peak pressure reading in a pressure range that is above a selected upper threshold would indicate that the engagement head 48, 164 is engaged with hard material and a peak pressure reading that is lower than a selected lower threshold would indicate that the engagement head 48, 164 is engaged with soft material or no material. It will be noted that if the pressure sensor were on line 210 a low peak pressure reading would indicate to the controller 182 that engagement head 48, 164 was engaged with hard material and a high peak pressure reading would indicate that the engagement head 48, 164 was engaged with soft material or no material.

If the pressure read from the sensor 180 indicates engagement with soft material or no material, then the controller 182 may be programmed to automatically deactivate the vibrator mechanism 118. For the purposes of this disclosure, deactivation of the vibrator mechanism 18, 118 refers to turning off the vibrator mechanism 18, 118 when it is on, and/or preventing the vibrator mechanism 18, 118 from being able to be turned on if it is off. If the pressure read from the sensor 180 indicates engagement with hard material, then the controller 182 may be programmed to respond in any of several ways. For example, the controller 182 may be programmed to automatically turn on the vibrator mechanism 18, 118. Alternatively, the controller 182 may be programmed to permit the turning on of the vibrator mechanism 18, 118 in the event that the vehicle operator tries to do so. As used herein, the term "altering an operational state" of the vibrator mechanism 18, 118 encompasses deactivating, activating and/or permitting activation of the vibrator mechanism 18, 118. In some embodiments, the vehicle 10 may include a switch that would permit the vehicle operator to choose between an 'automatic' mode in which the vibrator mechanism 18, 118 is automatically turned on when the pressure reading is sufficiently high, and a 'manual' mode in which the vibrator mechanism 18, 118 indicates to the vehicle operator that the vibrator mechanism 18, 118 can be turned on when the pressure reading is sufficiently high. It will be understood that when the vibrator mechanism is off, the pressure signal from the pressure sensor 180 may not cycle between two readings since the engagement head 48, 164 is not being reciprocated.

The upper and lower threshold pressures that are used by the controller 182 to determine whether to deactivate the vibrator mechanism 18, 118 may be different pressures, or alternatively, they may be the same pressure. In embodiments, wherein they are different pressures, the control logic may incorporate a hysteresis loop to prevent unwarranted rapid powering on and off of the vibrator mechanism. The control logic may also employ a timer to ensure a minimum power on or power off time so as to prohibit excessive switching frequencies. In an alternative embodiment of the control logic, a pressure sensor 180 may be employed on each of the lines 208 and 210, with the difference in pressure readings being used as the basis for controlling the operability of the vibrator 18, 118.

The controller 182 and the pressure sensor 180 together make up a control system. The term 'control system' is intended to be interpreted broadly, however. In a more complex embodiment, the control system may be a system with a controller with a microprocessor and digital memory and a pressure sensor that sends electrical signals to the microprocessor for use in determining the pressure. Alternatively, the control system could, in a simpler embodiment, be a simple electric circuit that is closed or opened based on the pressure sensed by pressure sensor 180. In yet another alternative embodiment the control system could be a hydraulic circuit that is closed or opened based on the pressure sensed by pressure sensor 180.

In one example, the pressure sensor 180 may be provided in the form of a pressure switch, such as a pressure switch having part number PSW-198 sold by Omega Engineering, Inc. of Stamford, Conn., USA which opens or closes a circuit based on the sensed pressure. In some embodiments, the opening or closing of the circuit may be sensed by controller 180 in order to determine what action to take. In other embodiments, the controller 182 may be omitted entirely and the opening or closing of the circuit may directly control whether the vibrator mechanism 18, 118 is operable or not.

In FIG. 4, the pressure sensor 180 is shown as being connected to the line 208. It is alternatively possible for the pressure sensor 180 to be connected to a tilt adjustment cylinder 36 or 152 itself.

Figure 6:
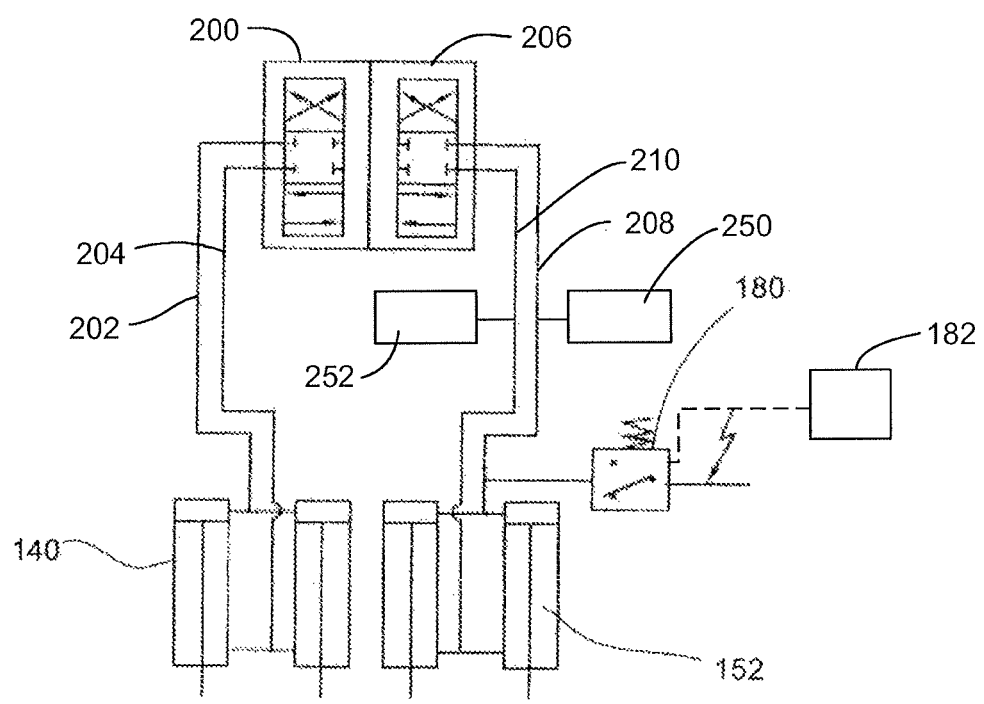
FIG. 6 is a simplified schematic diagram showing the portion of the hydraulic system and the control system shown in FIG. 4, and further including accumulators as part of the hydraulic system.

Reference is made to FIG. 6, which shows an alternative hydraulic layout, in which at least a first accumulator 250 and optionally a second accumulator 252 are connected to the lines 208 and 210, respectively. With certain types of tilt adjustment cylinders 36 or 152, the seal between the piston and bore of the cylinder can be extremely fluid tight. Especially when coupled with a valve 206 that provides essentially no leakage, fluid pressure trapped in the lines 208 and 210 can serve to function as a rigid fluid lock, allowing virtually no movement of the piston to take place. The expected increase in pressure can be less than anticipated in these cases, as the vibration of the vibrator 18, 118 is transferred directly to the vehicle or frame through the cylinders 36, 152. By installing the accumulator 250 and optionally 252 in the circuit, a small compressible volume is provided in the lines 208, 210 that allows the expected pressure fluctuation to occur. This improves the reliability of the operation of the control system.

While the above description constitutes a plurality of embodiments of the present invention, it will be appreciated that the present invention is susceptible to further modification and change without departing from the fair meaning of the accompanying claims.

The invention claimed is:

1. A ripping mechanism for a vehicle, comprising:
    a support frame;
    a ripping member having an engagement head that is configured for plowing a groove in the ground, wherein the ripping member is positionable in a selected working position and working orientation by adjustment of the support frame, and wherein the ripping member is movable relative to the support frame to cause reciprocating movement of the engagement head at least partially longitudinally;
    a tilt adjustment cylinder operable to orient the ripping member in the selected orientation;
    a vibrator mechanism operatively connected to the ripping member and activatable to cause reciprocating movement of the engagement head at least partially longitudinally; and,
    a control system including a pressure sensor fluidically connected to the tilt adjustment cylinder, the pressure sensor configured to determine a pressure of the tilt adjustment cylinder, wherein the control system is configured to alter an operational state of the vibrator mechanism based on the pressure being above or below a threshold pressure.

2. The ripping mechanism as claimed in claim 1, wherein altering the operational state comprises deactivating the vibrator mechanism and the control system is configured to deactivate the vibrator mechanism based at least in part on if the pressure is below a lower threshold pressure.

3. The ripping mechanism as claimed in claim 1, wherein altering the operational state comprises activating or permitting activation of the vibrator mechanism and the control system is configured to activate or permit activation of the vibrator mechanism based at least in part on if the pressure is above an upper threshold pressure.

4. The ripping mechanism as claimed in claim 2, wherein altering the operational state further comprises activating or permitting activation of the vibrator mechanism and the control system is configured to activate or permit activation of the vibrator mechanism based at least in part on if the pressure is above an upper threshold pressure that is the same pressure as the lower threshold pressure.

5. The ripping mechanism as claimed in claim 2, wherein altering the operational state further comprises activating or permitting activation of the vibrator mechanism and the control system is configured to activate or permit activation of the vibrator mechanism based at least in part on if the pressure is above an upper threshold pressure that is higher than the lower threshold pressure.

6. The ripping mechanism as claimed in claim 3, wherein the control system is configured to have an automatic mode wherein the control system is configured to activate the vibrator mechanism based at least in part on the pressure and a manual mode wherein the control system is configured to permit activation of the vibrator mechanism based at least in part on the pressure.

7. The ripping mechanism as claimed in claim 1, wherein the control system further comprises one or more accumulators.

8. The ripping mechanism as claimed in claim 1, wherein the control system further comprises an electronic controller.

9. The ripping mechanism as claimed in claim 1, wherein the control system further comprises a timer to determine whether or not to alter the operational state of the vibration mechanism.

10. The ripping mechanism as claimed in claim 1, wherein the pressure fluctuates in a range with a peak pressure within the range that changes depending on operations of the ripping mechanism, and wherein altering the operational state comprises activating or permitting activation of the vibrator mechanism, and wherein the control system is configured to activate or permit activation of the vibrator mechanism based at least in part on if the peak pressure is above an upper threshold pressure.

11. The ripping mechanism as claimed in claim 10, wherein altering the operational state further comprises deactivating the vibrator mechanism and the control system is configured to deactivate the vibrator mechanism based at least in part on if the peak pressure is below a lower threshold pressure.

12. The ripping mechanism as claimed in claim 1, wherein the pressure fluctuates in a range with a peak pressure within the range that changes depending on operations of the ripping mechanism, and wherein altering the operational state comprises activating or permitting activation of the vibrator mechanism, and wherein the control system is configured to activate or permit activation of the vibrator mechanism based at least in part on if an average of the peak pressure is above an upper threshold pressure.

13. The ripping mechanism as claimed in claim 1, wherein altering the operational state comprises permitting manual activation of the vibrator mechanism, and wherein the control system is configured to permit manual activation of the control system based at least in part on if the pressure is above an upper threshold pressure.

* * * * *